A. V. YOUNG.
CHERRY PICKER.
APPLICATION FILED OCT. 30, 1916.
1,263,505.
Patented Apr. 23, 1918.
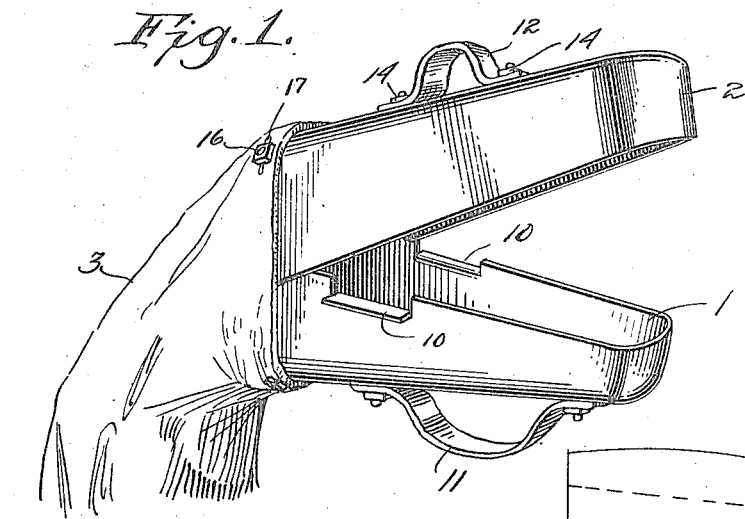
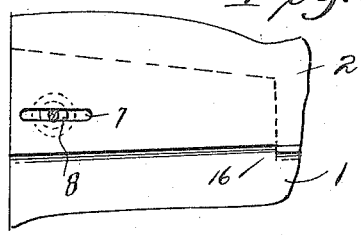
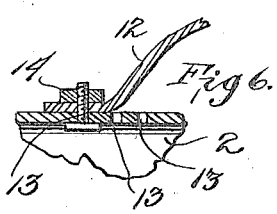
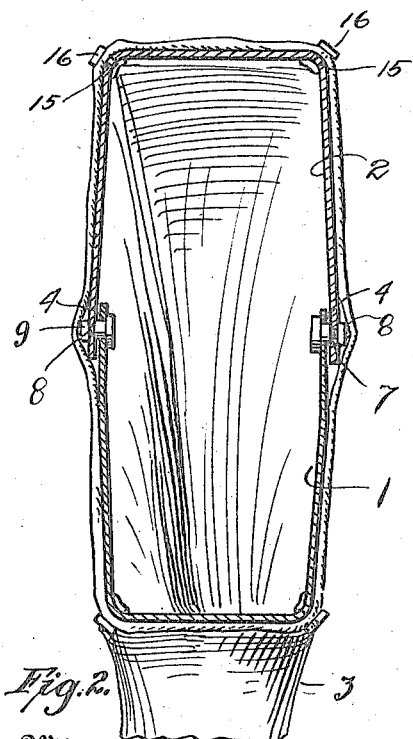
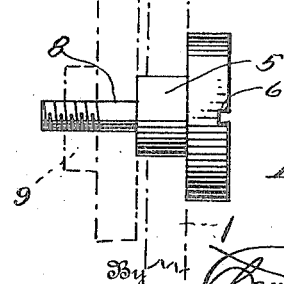
Inventor
A. V. Young.
Attorneys

UNITED STATES PATENT OFFICE.

AUGUST V. YOUNG, OF LOGCABIN, COLORADO.

CHERRY-PICKER.

1,263,505.	Specification of Letters Patent.	Patented Apr. 23, 1918.

Application filed October 30, 1916. Serial No. 128,529.

*To all whom it may concern:*

Be it known that I, AUGUST V. YOUNG, a citizen of the United States, residing at Logcabin, in the county of Larimer, State of Colorado, have invented certain new and useful Improvements in Cherry-Pickers; and I do hereby declare the following to be a full, clear and exact description of the invention, such as will enable others skilled in the art to which it appertains to make and use the same.

This invention relates to fruit pickers.

The object of the invention is to provide a simple and practical device for picking small fruit such as cherries. As is well known, cherries hang from the trees in clusters, and sometimes do not extend directly downward, so that with pickers ordinarily in use, it is often difficult to secure a good hold upon the stems before clipping the fruit. It is a practical necessity to secure the stems with the fruit since the fruit decays more rapidly at the spot where the stem is attached, after the latter has been removed. By means of my invention, the necessity of picking the cherries by hand is avoided, and the device is furthermore also so constructed that the fruit may be clipped from almost any position and cleanly cut from the tree. To this end, the device consists of a pair of trough-like jaws having continuous cutting edges upon both sides and at the forward ends thereof, so that from whatever angle the stems of the fruit are clipped by the device, they may be cut, and the fruit directed into a suitable bag or other receptacle which is carried by the lower end of the device.

With the above objects in view and such other objects as may hereinafter appear, my invention will now be fully set forth and described, reference being had to the accompanying drawings.

In the drawings:—

Figure 1 is a perspective of the device with the jaws partly open,

Fig. 2 is a vertical section through the jaws of the device showing the joints therebetween, Fig. 3 is an enlarged detail view of one of the joints, part of the connecting pin being broken away for the sake of clearness, Fig. 4 is a detail of one of the jaws showing the manner of its connection to the other jaw, and Fig. 5 is an enlarged detail view of the connecting pins.

Fig. 6 is a detail sectional view of the handle attaching means.

Referring more particularly to the drawings, 1 and 2 indicate, respectively, the coöperating jaws of the device, to which is attached the bag 3 in which the fruit is dropped after being cut from the trees, between the opposing edges of the jaws 1 and 2. Each of the jaws, generally, consists of a trough-like device having its forward end closed, while its rear end stands open, the open ends of the jaws, when the latter are connected together, providing a throat through which the fruit is dropped into the sack or receptacle 3. The jaws gradually increase in transverse dimensions from the closed forward ends to the open or delivery ends, so that a suitably wide chute is provided for dropping the fruit into the receptacle. The jaw 1, at the free corners of the rear ends of the sides thereof is provided with the circular openings 4 which provide bearings for the reception of the shoulders 5 of the pins or studs 6, the heads of the studs 6 resting against the inner faces of the sides of the jaw 1, and the shoulders 5 being of sufficient length to freely receive the thickness of the sides to permit rotation of the jaw 1 at any time. The corresponding free corners of the jaw 2 are provided with the longitudinal slots 7 which are of sufficient width to pass over the reduced shanks 8 of the studs 6, a nut 9 upon each one of the studs 6 providing a means for clamping the corners of the jaw 2 against the outer end or face of the shoulders 5, the latter being of sufficient length as above stated to permit the free rotation of the jaw 1 upon the studs when the jaw 2 is clamped thereagainst. The slots 7 are of sufficient length to permit the adjustment of the jaw 2 upon the reduced portions 8 relative to the jaw 1, so that a proper relationship of the edges of the jaws may be maintained. Since provision is thus made for the rigid connection of the studs 6 to the jaw 2 without interfering with the free movement of the jaw 1 upon the studs, it is obvious that the adjustment may be readily effected and maintained.

The longitudinal edges and the free edges of the closed ends of the jaws 1 and 2 are sharpened after the manner of scissors' edges to provide for the effective cutting or snipping of the stems of the fruit. Thus, since the free edges of the jaw 1 seat within the edges of the jaw 2, the latter are beveled from the outside in sharpening, while the edges of the jaw 1 are beveled from the inside. Near the rear end of the jaw 1, the walls of the latter are cut laterally and turned outwardly to provide a stop 10 which limits the movement of the inclosing sides of the jaw 2 when the jaws are brought together. Upon the backs of the jaws 1 and 2 are secured the hand straps 11 and 12 respectively. The strap 11 is of sufficient length to permit the insertion of the fingers of the hand while the strap 12 is of shorter length to receive the thumb of the hand, so that the opening and closing of the hand will operate the device. Each of the jaws is provided with a plurality of openings 13 through which the securing bolts 14 may be selectively passed in order to adjustably fix the straps 11 and 12 for the purpose of regulating the latter to the size of the hand of the user.

The open or rear ends of the jaws are provided with a plurality of openings 15 through which securing bolts or other fastenings 16 are passed for the purpose of supporting the sack 3 in position, suitable eyelets 17 being provided around the edges of the latter for receiving the fastening devices.

The jaws are made of any suitable sheet material, which will maintain a cutting edge, and which may be shaped into the general form indicated in the drawings, the closed ends of the jaws being either stamped into the proper shape or else being formed from blanks which are subsequently shaped and have their edges secured.

From the foregoing, it is apparent that I have provided a very simple and practical device for picking cherries or other small fruit. The construction of the picker is such that it may be manipulated with one hand, and permits the gathering of the fruit from substantially any angle, either when the operator must reach for the fruit from an inconvenient posture or when the stems of the fruit project at unusual angles. In each case, the stems may be clipped so as to preserve the stems intact upon the fruit, thus delivering the fruit to the packers in condition to be packed without the usual loss from unstemmed fruit.

What I claim as my invention is:—

A fruit picker comprising in combination, an inner and an outer jaw, and studs hingeing said jaws together, each of the studs having a shoulder portion providing a journal for the inner jaw and a reduced portion for receiving the outer jaw, the latter having longitudinal slots seated on the reduced portions and means for clamping the outer jaw against said shoulder.

In testimony whereof I affix my signature in the presence of two witnesses.

AUGUST V. YOUNG.

Witnesses:
H. W. SEAMAN,
BEN. L. BEMAN.

Copies of this patent may be obtained for five cents each, by addressing the "Commissioner of Patents, Washington, D. C."